Feb. 12, 1924.
F. TAUSZ ET AL
1,483,131
LIQUID LEVEL GAUGE
Filed Feb. 5, 1921    2 Sheets-Sheet 1
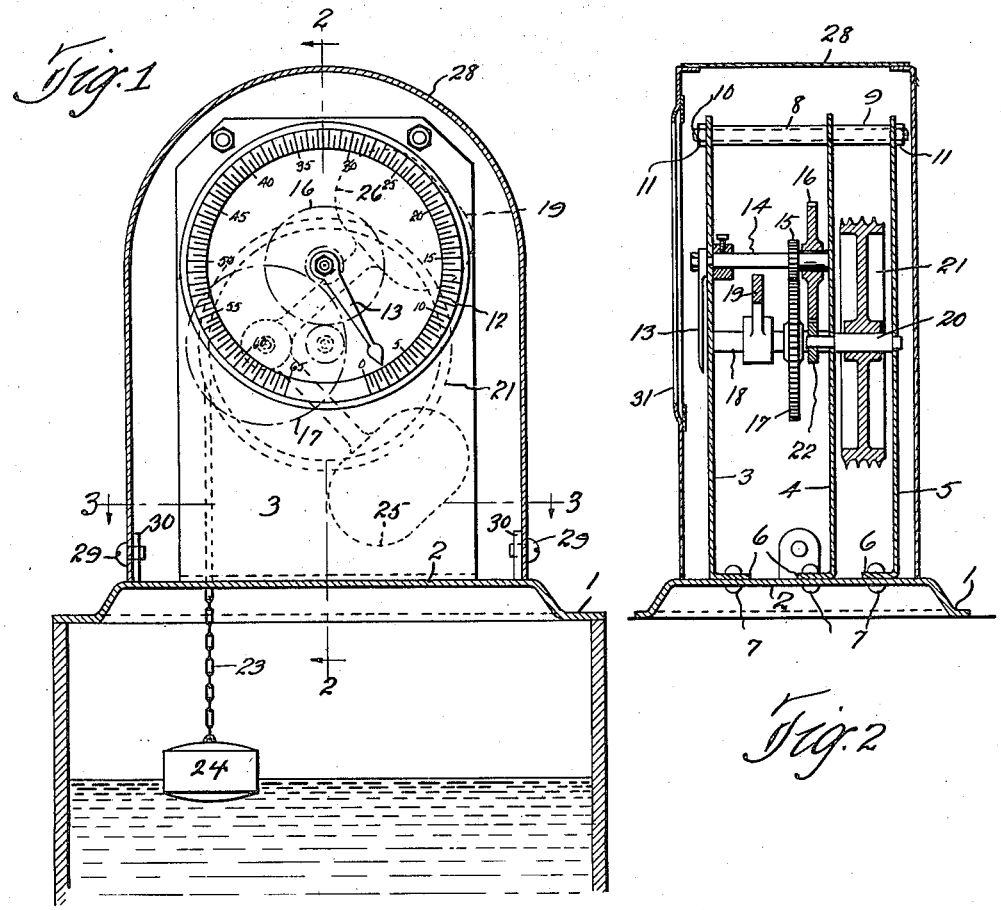
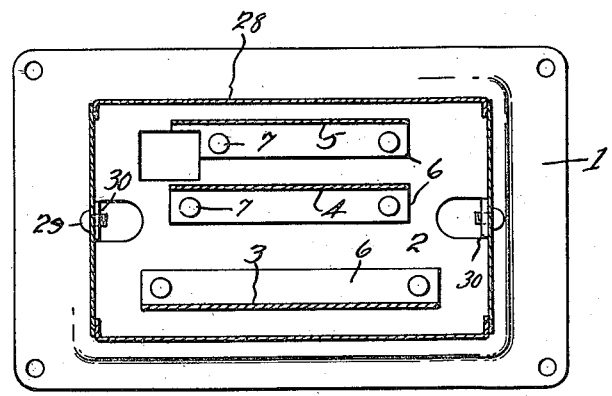
Inventors
F. Tausz
C. D. Benson Jr.
By Hull Brock & West
Attys.

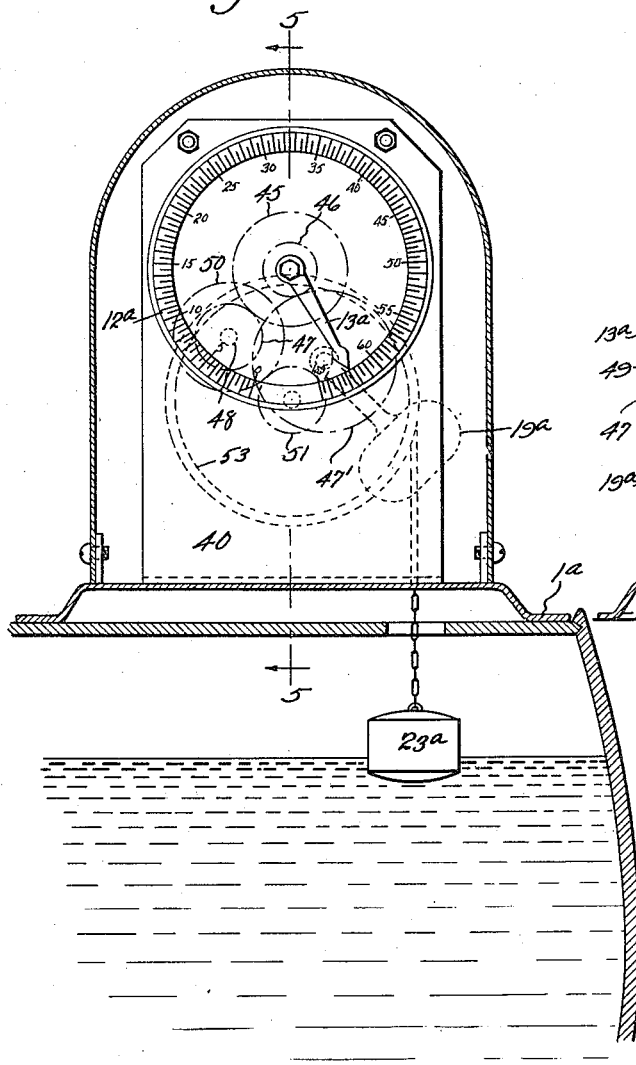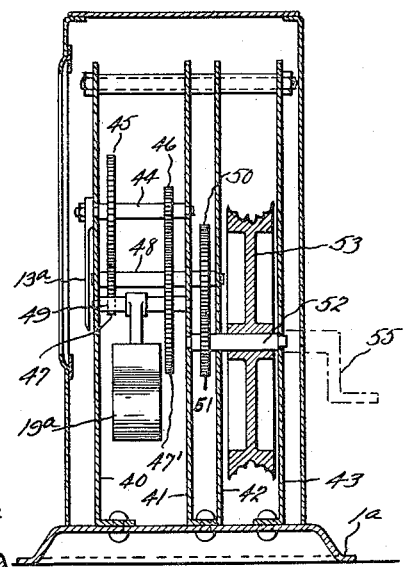

Patented Feb. 12, 1924.

1,483,131

UNITED STATES PATENT OFFICE.

FERDINAND TAUSZ, OF CLEVELAND HEIGHTS, AND CHARLES D. BENSON, JR., OF CLEVELAND, OHIO.

LIQUID-LEVEL GAUGE.

Application filed February 5, 1921. Serial No. 442,813.

*To all whom it may concern:*

Be it known that we, (1) FERDINAND TAUSZ, (2) CHARLES D. BENSON, Jr., (1) a subject of Austria, (2) citizen of the United States, residing at (1) Cleveland Heights, (2) Cleveland, in the county of Cuyahoga and State of Ohio, have invented a certain new and useful Improvement in Liquid-Level Gauges, of which the following is a full, clear, and exact description, reference being had to the accompanying drawings.

This invention relates to gauges and is directed more particularly to that class of gauges which are used in connection with barrels and similar containers for continuously indicating the level or volume of the contents therein. The invention is also adapted for use in connection with storage tanks of filling stations.

Some of the objects of the present invention are to provide a gauge which shall be capable of continuously indicating the contents of a container having either a straight or irregular shaped side wall; to provide a gauge of the aforesaid character which may be quickly and easily attached or removed from a container and which shall continuously indicate the contents thereof; to provide a gauge which shall consist of few parts that are simple in construction and inexpensive to manufacture, while further objects and advantages will appear as the description proceeds.

In the accompanying drawings wherein we have shown certain illustrative forms of our invention, but without intent to limit ourselves thereto, Fig. 1 is a vertical sectional view through one form of a gauge constructed in accordance with our invention; Figs. 2 and 3 are sectional views taken respectively on the lines 2—2 and 3—3 of Fig. 1; Fig. 4 is a front elevation of a modified form of gauge; and Fig. 5 is a sectional view taken on the line 5—5 of Fig. 4.

Describing by reference characters the various parts illustrated, and referring particularly to Figs. 1 to 3, 1 indicates the base of our gauge which may be made from sheet metal, upset as indicated at 2 to form a sub base on which a series of vertical supports 3, 4 and 5 are mounted. These supports may also be made from sheet metal and are preferably turned over at their bottom edges to form an attaching flange 6 which is secured to the sub base by rivets 7 or other suitable means. The vertical supports 3, 4 and 5 are held in spaced relationship at their upper edges by spacing sleeves 8 and 9 interposed therebetween and a tie rod 10 passing through said supports and the spacing sleeves and having nuts 11—11 threaded on the ends thereof bind said parts together.

A graduated dial 12 mounted on the front side of the support 3 and a pointer 13 fastened to the front end of the shaft 14 serve to indicate the contents of the container to which the gauge is attached. The shaft 14 is journaled in the supports 3 and 4 and carries a small gear 15 and a large gear 16. The gear 15 meshes with a large gear 17 which is mounted on a shaft 18 journaled between the supports 3 and 4 and said shaft also mounts a counterweight 19 for a purpose to be described hereinafter.

A shaft 20 journaled between supports 4 and 5 has mounted thereon a spiral drum 21 and as shown in Fig. 2 this shaft 20 projects through the support 4 and carries a small gear 22 which meshes with the gear 16. A chain or cable 23 is passed about the spiral drum 21 and has one end fastened thereto while the other end depends downwardly into the container and is attached to a float 24 which is adapted to rise and fall with the fluid level of the contents of the container.

The various parts are preferably constructed and arranged so that when the float is at maximum level and the chain or cable fully wound on the drum, the counterweight 19 will assume a position as indicated by the dotted lines 25 in Fig. 1 and the mass of the counterweight 19 is preferably such that it will keep the chain or cable taut at all times but permit the float to rise and fall with the fluid level.

With the gauge positioned over a straight walled container as shown in Fig. 1, the operation will be as follows: As the fluid level falls, the float 24 will fall therewith and exert a pull on the chain or cable 23 which rotates the drum 21 and shaft 20. This rotary motion is transmitted to shaft 14 and pointer 13 through gears 22 and 16 and also to shaft 18 and counterweight 19 through gears 15 and 17. The pointer 13 is rotated in a clockwise direction about the dial to indicate the contents of the container at any particular instant. The counterweight is rotated in a counter clockwise direction and is gradually raised until it reaches a position indicated by the dotted lines 26 in Fig. 1, at which time the float will have reached its minimum fluid level. If at any time, fluid is added to the container, the float will rise and the counterweight 19 will exert a force through shaft 18, gears 17 and 15, to shaft 14 from whence it will be transmitted through gears 16 and 22 to the drum shaft to wind up the slack in the chain.

A casing 28 enclosing the gauge mechanism is secured by screws 29—29 to ears 30 struck up from the sub base, and said casing is provided with a window 31 through which the dial 12 and pointer 13 may be viewed.

In Figs. 4 and 5 we have shown a modified form of gauge and also one which is capable of indicating the fluid contents of a container having an irregular shaped side wall, the container in this instance being a barrel having bilged sides. The base $1^a$ is similar to that previously described and mounted on said base are a series of vertical supports 40, 41, 42 and 43. The pointer $13^a$ is mounted on one end of a shaft 44 which is journaled in the supports 40 and 41 and said shaft also mounts thereon a large gear 45 and a smaller gear 46.

The gear 45 meshes with a smaller gear 47 which is mounted on a shaft 48 journaled between the vertical supports 40 and 42, and gear 46 meshes with a larger gear 47′ which is fastened to the counterweight shaft 49 which is journaled in vertical supports 40 and 41.

The shaft 48 also mounts thereon a larger gear 50 which meshes with a smaller gear 51 mounted on a shaft 52 which is journaled between vertical supports 41 and 43. The shaft 52 also mounts a winding drum 53 which is provided with a concave winding surface in order to compensate for the change of relationship beween the height of the fluid level and the volume thereof, such change being due to the bilged wall of the container.

In this form of gauge we have shown the dial $12^a$ graduated in the reverse direction from that previously described and hence this gauge will indicate the total contents withdrawn from the barrel.

The operation of this form of gauge will be as follows:

The float $23^a$ will rise and fall to rotate the winding drum 53, as set forth in connection with Figs. 1 to 3. The rotary motion of the winding drum will be transmitted through gears 51 and 50 to shaft 48 and thence through gears 47 and 45 to the pointer $13^a$. The counterweight $19^a$ will be raised by the rotary motion transmitted from shaft 44 through gears 46 and 47 as the float moves from a maximum to a minimum level.

A crank 55 is shown attached to the squared end of the shaft 52 so that when it is desired to remove the gauge and transfer it to another container the chain may be wound on the winding drum 53 and the float withdrawn from the container. This crank, however, is not necessary since the counterweight will serve to rewind the chain on the drum if the float is raised.

While we have shown and described winding drums having straight and concaved surfaces it will be understood that said surfaces could be made any desired shape to conform with the change of volume of the container at various fluid levels, and that said winding drums are interchangeable with either form of gearing such as described in this application.

Having thus described our invention, what we claim is:

A gauge of the class described comprising a float member adapted to rise and fall with the fluid level of a container, a winding drum, a flexible member engaged about the surface of said drum and connected with said float, an indicating mechanism geared to said winding drum, and a counterweight interposed in said connection, said counterweight comprising a weighted arm rigidly connected to one of the gears and being adapted to rise and fall respectively with the fall and rise of said float member thereby to keep said flexible member taut at all positions of said float.

In testimony whereof, we hereunto affix our signatures.

FERDINAND TAUSZ.
CHAS. D. BENSON, Jr.